Jan. 30, 1940.  F. W. CRAWFORD  2,188,831
DUAL CRANK AND CONNECTING ROD ASSEMBLY
Filed Sept. 1, 1938
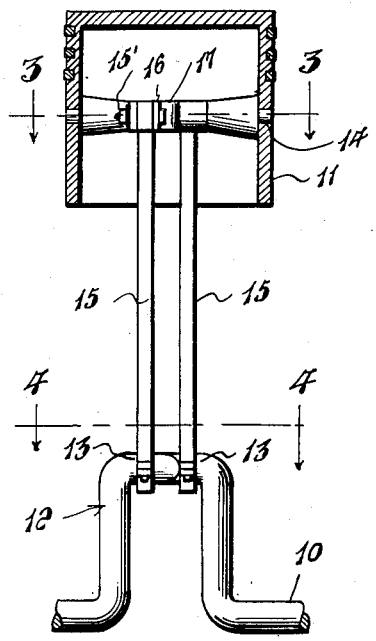
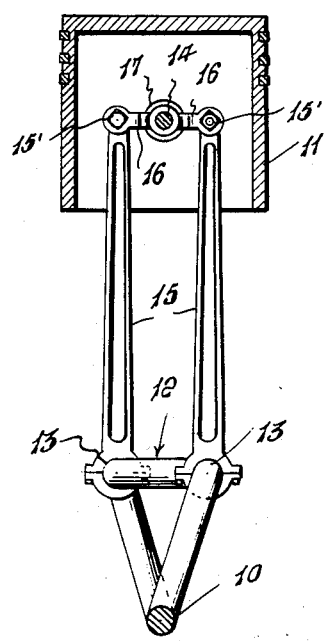
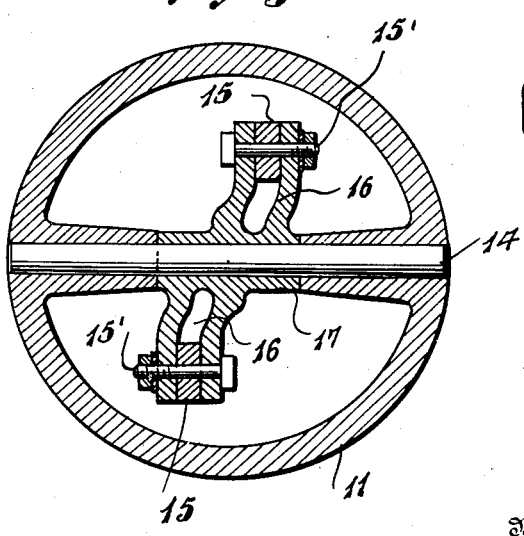
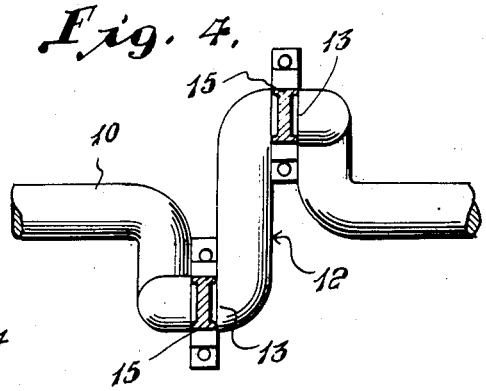
Inventor
F. W. Crawford Patented Jan. 30, 1940

2,188,831

UNITED STATES PATENT OFFICE 2,188,831

DUAL CRANK AND CONNECTING ROD ASSEMBLY

Furman W. Crawford, Caradan, Tex.

Application September 1, 1938, Serial No. 228,060

5 Claims. (Cl. 74—44)

This invention relates to means for more efficiently driving the crankshaft of an internal combustion engine or the equivalent, through the motion of the piston or pistons and especially aims to provide a construction which will deliver greater torque from the energy expended in the engine.

It is further aimed to provide a construction wherein the piston has an evener or rocker attached thereto with connecting rods extending from opposite ends thereof and attached to crank means on the crankshaft, on opposite sides of a radial line passing through the axis of rotation of such crankshaft.

The more specific objects and advantages will become apparent from a consideration of the description following taken in connection with accompanying drawing illustrating an operative embodiment.

In said drawing—

Figure 1 is a view showing the improved assembly in connection with a piston, the latter being shown in section;

Figure 2 is a view of the parts of Figure 1 taken at a right angle thereto, with the piston also shown in section;

Figure 3 is a horizontal section taken on the line 3—3 of Figure 1; and

Figure 4 is a detail section taken on the line 4—4 of Figure 1.

Referring specifically to the drawing wherein like reference characters designate like or similar parts, 10 designates a crankshaft of an internal combustion engine or any equivalent. The engine of course may be driven by any desired number of cylinders and pistons and hence the single piston shown at 11, is to be taken as more or less diagrammatic and by way of illustration only. Such crankshaft 10 for each piston has a crank device generally designated 12 and which includes crank portions 13 located on opposite sides of a radial line or a line passing through the axis of rotation of crankshaft 10 and the axis of a wrist pin 14 on the piston, as best shown in Figure 2, that is when the connecting rods designated 15 are parallel.

Said connecting rods 15 at their lower ends, are detachably connected to and journaled on the crank portions 13. At their upper ends, said connecting rods 15 are detachably bolted and pivotally connected as at 15' to bifurcated opposite end portions 16 of a rocker member 17 journaled on the wrist pin 14. Obviously, the wrist pin 14 should be rotatably mounted in the piston and have the rocker rigidly connected thereto.

The opposite ends of the rocker 17 are disalined with each other for more efficiency and to locate the parts so that there will be no interference in operation.

With the construction, the crankshaft may operate clockwise or counterclockwise according to the operation of the engine. In the operation, all of the pressure of the piston is exerted on both of the connecting rods 15 and the rocker 17 evenly and efficiently distributes such pressure. The distance or relative location of the cranks 13 apart, will be governed by the particular engine. The arrangement shown will deliver greater torque from the energy expended in the engine, will begin delivering greater torque instantly after "dead center" position has been reached and when the piston pressure is at the highest, will continue to deliver more torque advantageously throughout the power stroke, will reduce friction by providing more free outlet for pressure in the combustion chamber, will lengthen the period during which combustion pressure on the piston is efficiently delivering torque or power to the crankshaft and will have a tendency with the use of the dual connecting rods at "dead center" to hold the momentum already gained.

The crankshaft proper may, if desired, be placed slightly to the side of piston alinement.

Various changes may be resorted to provided they fall within the spirit and scope of the invention.

I claim as my invention:

1. In an assembly of the class described, a crankshaft having a crank provided with circumferentially spaced portions, a connecting rod secured to each portion, a piston having a wrist pin, a rocker mounted by the wrist pin, and said connecting rods being in parallelism and secured to said rocker on opposite sides of the axis of the wrist pin.

2. In an assembly of the class described, a crankshaft having a crank provided with circumferentially spaced portions, a connecting rod secured to each portion, a piston having a wrist pin, a rocker mounted by the wrist pin, said connecting rods being in parallelism and secured to said rocker on opposite sides of the axis of the wrist pin, said portions being disalined transversely of the crankshaft.

3. In an assembly of the class described, a crankshaft having a crank provided with circumferentially spaced portions, a connecting rod secured to each portion, a piston having a wrist pin, a rocker mounted by the wrist pin, said connecting rods being in parallelism and secured to said rocker on opposite sides of the axis of the wrist pin, said rocker having its end portions transversely disalined.

4. In an assembly of the class described, a crankshaft having a crank provided with circumferentially spaced portions, a connecting rod secured to each portion, a piston having a wrist pin, a rocker mounted by the wrist pin, said connecting rods being in parallelism and secured to said rocker on opposite sides of the axis of the wrist pin, said portions being disalined transversely of the crankshaft, said rocker having its end portions transversely disalined.

5. An assembly of the class described having a piston, lever means pivoted thereto, parallel connecting rods secured one on each side of the axis of the lever means and flexibly to the lever means, a crankshaft provided with a crank, and said connecting rods being journaled on the crank at spaced locations.

FURMAN W. CRAWFORD.